United States Patent [19]
Rote et al.

[11] Patent Number: 5,245,726
[45] Date of Patent: Sep. 21, 1993

[54] APPARATUS FOR PICKING UP AND SHREDDING NATURAL YARD WASTE

[76] Inventors: Scott J. Rote, c/o Echo, Inc., 400 Oakwood Rd.; Thomas H. Lohr, 1295 Bristol Trail Rd., both of Lake Zurich, Ill. 60047

[21] Appl. No.: 733,427

[22] Filed: Jul. 22, 1991

[51] Int. Cl.$^5$ .............................................. A47L 5/24
[52] U.S. Cl. ...................... 15/339; 15/344; 15/405; 241/55; 241/56; 415/121.1
[58] Field of Search .................. 15/339, 405; 241/55, 241/56-58; 415/121.1

[56] References Cited

U.S. PATENT DOCUMENTS

| | | |
|---|---|---|
| Re. 33,050 | 9/1989 | Tuggle et al. . |
| 2,105,803 | 1/1938 | Barnes . |
| 2,987,983 | 6/1961 | Solzman . |
| 3,035,621 | 5/1962 | Burcham ........................... 241/56 X |
| 3,608,838 | 9/1971 | Lundin . |
| 3,618,157 | 11/1971 | Bassin . |
| 3,712,358 | 1/1973 | Ferry . |
| 3,716,089 | 2/1973 | Bateman . |
| 3,716,198 | 2/1973 | Lautzenheiser . |
| 3,790,986 | 2/1974 | Burger . |
| 3,860,181 | 1/1975 | Enters et al. . |
| 3,929,236 | 12/1975 | Koturov . |
| 3,968,938 | 7/1976 | Ruhl et al. . |
| 3,986,676 | 10/1976 | Husmann ........................ 241/56 X |
| 4,074,869 | 2/1978 | Johnson . |
| 4,076,460 | 2/1978 | Roof . |
| 4,117,983 | 10/1978 | Browning . |
| 4,223,419 | 9/1980 | Sato et al. . |
| 4,227,280 | 10/1980 | Comer . |
| 4,250,868 | 2/1981 | Frye . |
| 4,286,675 | 9/1981 | Tuggle . |
| 4,288,886 | 9/1981 | Siegler . |
| 4,290,165 | 9/1981 | Hiramatsu et al. . |
| 4,318,203 | 3/1982 | Satoh et al. . |
| 4,325,163 | 4/1982 | Mattson et al. . |
| 4,344,370 | 8/1982 | Smith et al. . |
| 4,451,951 | 6/1984 | Satoh . |
| 4,461,055 | 6/1984 | Zerrer et al. . |
| 4,469,283 | 9/1984 | Noguchi et al. .................. 241/57 X |
| 4,644,606 | 2/1987 | Luerken et al. . |
| 4,875,630 | 10/1989 | Carlson . |
| 4,951,882 | 8/1990 | Ober . |

OTHER PUBLICATIONS

Power Blowwers Parts Catalog, Model Nos. PB-1000 and PB-1010.
Echo Operator's Manual Power Blower, Model Nos. PB-1000 and PB-1010.
Black & Decker Lawn and Garden Products 1990-1991 Catalog, pp. 12, 13 and 15.
TrimRite Advertisement.
Catalog Advertisement of McCulloch Mac-Vac.
Echo Vac-Sac Advertisement.

*Primary Examiner*—Chris K. Moore
*Attorney, Agent, or Firm*—Wood, Phillips, VanSanten, Hoffman & Ertel

[57] ABSTRACT

An apparatus for shredding/reducing the size of material yard waste and having: a housing defining an intake opening through which yard waste is to be drawn and an outlet opening through which yard waste drawn through the intake opening can be expelled; an impeller having a rotational axis and at least one vane for intercepting yard waste at the intake opening and propelling the yard waste intercepted by the impeller vane centrifugally to be expelled at the outlet opening; and a cutting structure/cutting attachment for reducing the size of yard waste drawn into the intake opening and advancing towards the impeller. The cutting structures includes at least one elongate blade having its length projecting substantially parallel to the rotational axis of the impeller. In one form of the invention, the blade rotates with the impeller.

28 Claims, 4 Drawing Sheets

APPARATUS FOR PICKING UP AND SHREDDING NATURAL YARD WASTE

BACKGROUND OF THE INVENTION

1. Field of the Invention

This invention relates to apparatus for picking up natural yard waste such as leaves, small twigs, pine needles and the like and, more particularly, to a device for reducing the size of this natural yard waste to a particle size that facilitates compact containment thereof and effective use as garden mulch and/or compost.

2. Background Art

In the past, it was common to dispose of yard waste such as leaves, twigs, pine needles, and lightweight garden debris by either burning such materials or packing the same in containers to be conveniently hauled off to landfills. However, such disposal alternatives are generally no longer available to the average homeowner. The ever increasing concern for the environment has made burning illegal in many areas. Further, many waste disposal sites no longer even accept yard waste This is due in part to the tremendous volume of waste material which results in the unacceptably rapid filling of these sites, thereby necessitating the opening of additional disposal sites.

Provisions have been made, however, for hauling away yard-type waste. It is common for those picking up such waste to first require the homeowner to purchase biodegradable containers. Further, the pickup costs are normally considerably higher than for normal garbage pickup. Consequently, disposal by this method is quite costly.

The above problems have spurred purveyors of gardening equipment to develop viable alternatives for disposing of/utilizing garden waste. One desirable alternative to disposing of such material is to cut up/pulverize the materials on site to make them useable as valuable mulch or compost material. However, heretofore, the equipment available to produce such mulch and compost has been relatively undesirable for a number of different reasons For example, devices such as that in U.S. Pat. No. 3,712,353, to Ferry, are, if constructed to be effective for garden waste pickup and treatment, quite large and difficult to operate. The Ferry structure is incapable of reaching into tight spots such as between trees and bushes. Additionally, one must deal with the problem of storing the rather obtrusive device when not in use.

An alternative to a structure such as Ferry's is shown in U.S. Pat. No. 4,325,163, to Mattson et al. The Mattson et al structure has the advantage that it is portable, however has other drawbacks Structures such as Mattson et al's have been advertised in the industry as pulverizers without the use of any type of cutting blade, as shown therein, and have relied solely upon the impeller vanes to effect the material size reduction While inherently the impeller, by reason of impacting and centrifugally propelled incoming materials, effects a certain amount of particle size reduction, the percentage of size reduction achievable has been found by the inventors herein to be relatively unsatisfactory, particularly where a fine mulch is desired.

Another problem that is inherent when the impeller is used as the sole cutting instrument is that the cut particles remain relatively large. There is a tendency of the equipment to clog by reason of these large particles wedging in the housing. This requires periodic stopping, disassembly, and cleaning of the device, which is clearly inconvenient and undesirable.

SUMMARY OF THE INVENTION

The present invention is specifically directed to overcoming the above enumerated problems in a novel and simple manner.

The present invention comprehends an apparatus for shredding/reducing the size of material yard waste and having: a housing defining an intake opening through which yard waste is to be drawn and an outlet opening through which yard waste drawn through the intake opening can be expelled; an impeller having a rotational axis and at least one vane for intercepting yard waste at the intake opening and propelling the yard waste intercepted by the impeller vane centrifugally to be expelled at the outlet opening; and a cutting structure/cutting attachment for reducing the size of yard waste drawn into the intake opening and advancing towards the impeller. The cutting structures includes at least one elongate blade having its length projecting substantially parallel to the rotational axis of the impeller. In one form of the invention, the blade rotates with the impeller.

In a preferred form, an intake tube/conduit has an internal passageway in communication with the housing intake opening and the blade extends at least partially into the internal passageway of the intake tube/conduit.

It is the principal objective of the present invention to cut up/pulverize natural yard waste to a useable size with a structure that is quite simple and potentially very light in weight and portable, yet one which is not prone to jamming even with damp materials, as would otherwise require periodic disassembly and maintenance. The blade tends to effectively tear up the incoming yard waste before it can encounter the impeller.

Preferably, there are a plurality of the elongate blades with their lengths substantially aligned. The blades preferably project in cantilever fashion so that the free ends thereof grab, shred, and pulverize the incoming yard waste so that it is effectively pulverized before it encounters the impeller. This minimizes the aforementioned jamming problem.

Preferably, the diameter of the path traced by the blade(s) is less than the diameter of the intake opening to facilitate this shredding and to prevent wedging of the incoming materials between the blades and any other part of the device such as the housing and/or impeller during operation. This further allows the incoming yard waste to be rather violently swirled and shredded by the cutting structure in use. In a preferred form, the intake opening is on order of 1.4 to 1.7 times the diameter of the path traced by the blade(s) to facilitate this swirling action and prevent jamming.

In one form, the cutting structure has a base with each blade connected thereto through an arm. The invention contemplates different numbers, sizes, shapes and lengths of the cutting blades. Four such blades spaced at equal angular intervals relative to the central axis of the cutting structure has been proven to be effective, however this number should not be viewed as limiting. The cutting structure can have equal length blades or a combination of long and short blades. Still further contemplated by the invention is a cutting structure with blades spaced at different intervals from the rotational axis of the cutting structure.

In a preferred form, the impeller is mounted on a shaft driven by a power unit and the cutting structure is attached to at least one of the shaft and impeller. Preferably, the cutting structure is removably attached so that the apparatus can be used selectively with and without the cutting structure. This further facilitates the repair and/or replacement of the cutting structure.

The cutting structure can be made in a number of different ways. In one form, a base is provided to mount the cutting structure and there are connecting arms that support the blades on the base. Reinforcing structure can be incorporated to increase the life of the cutting structure and prevent bending of the blade(s).

The cutting structure has the further advantage that it can be retrofit to commercially available blowers/vacuums. This allows such conventional structures to be particularly more effective as pulverizers. For example, one of the blower/vacuum products currently being sold by the assignee herein and fit with the inventive cutting structure has been tested to reduce material up to 1/10th its original size - a highly effective volume reduction ratio and considerably improved over the same ratio in the absence of the cutting structure.

DETAILED DESCRIPTION OF THE DRAWINGS

Figure 1:
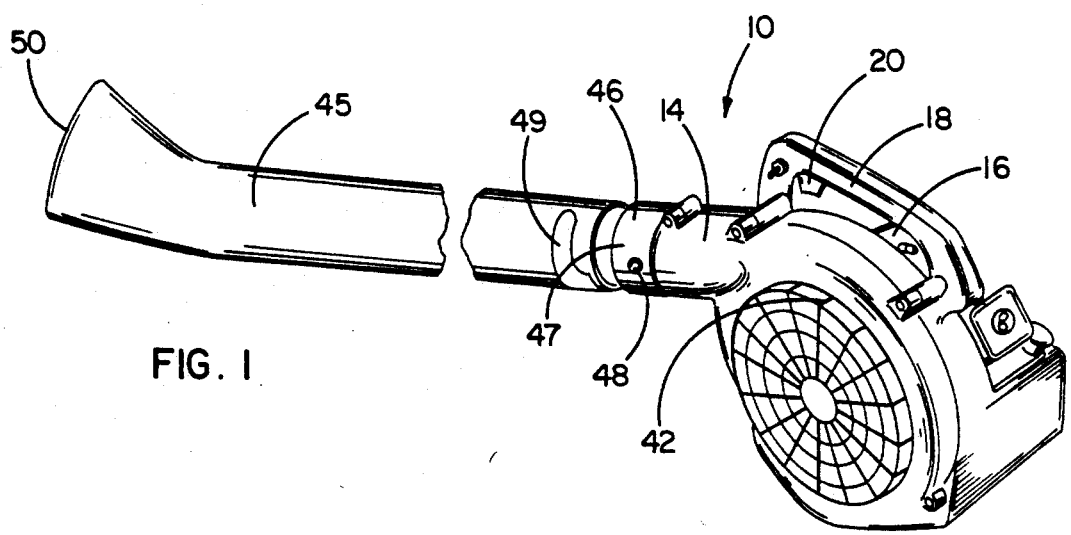
FIG. 1 is a perspective view of a blower/vacuum apparatus with a cutting structure/cutting attachment according to the present invention incorporated therein and shown in the blower mode.

In FIGS. 1–6, a vacuum/blower apparatus is shown at 10 having incorporated therein a cutting means/cutting attachment at 12 according to the present invention.

The basic apparatus 10 shown is merely one example of a structure with which the present invention can be practiced. The apparatus 10 shown is the assignee's currently available Model PB-1010. It is unnecessary to understand all the details of operation of the apparatus 10. The description herein will be limited to those parts of the apparatus 10 necessary to describe the environment for the present invention.

More specifically, the apparatus 10 has a housing 14 defining a support for an engine 16 and a generally inverted, U-shaped handle 18 through which the unit 10 can be readily manipulated. A depressible trigger 20 is conveniently positioned to control the speed of the engine 16 through a finger on the hand of the user grasping the handle 18.

The housing 14 further defines a chamber 22 which creates a communication path between intake and outlet openings 24, 26, respectively. The housing 14 defines a subchamber 28 for an impeller 30 which is driven rotatably by the engine 16 about an axis 32. The impeller 30 has a plurality of circumferentially spaced vanes 34 which, with the impeller 30 rotated, develop a continuous flow of air through the intake opening 24 in the direction of arrow 36 towards and out of the outlet opening 26 as indicated by the arrow 38. Normal rotation of the impeller 30 creates suction at the intake opening 24 and develops a forcible air discharge at the outlet opening 26.

The Model PB-1010 is selectively usable in either a blower mode or a vacuum mode. An annular rim 40, which can be either continuous or interrupted by circumferentially spaced, axially extending slots 41, surrounds the intake opening 24 and defines a mounting support for a debris cover 42, which allows air to enter the intake opening 24 but shields the user from the rotating impeller 30 and prevents large objects from impacting the impeller 30.

With the apparatus 10 in the blower mode of FIG. 1, the debris cover 42 surrounds the outer surface 44 of the rim 40 and is suitably held thereon. An optional blower tube 45 frictionally embraces the outer surface 46 of a connector 47, integrally formed on the housing 14 and defining the outlet opening 26. An outwardly projecting dimple(s) 48 on the outer surface 46 of the connector 47 is arranged to be received in a raised, L-shaped guide 49. As the tube 45 is directed over the connector 47, the dimple 48 moves in the guide 49. Once the tube 45 is fully seated, the tube 45 can be turned to effect releasable locking thereof on the connector 47. In this mode, the air is drawn through the intake opening 24 and exhausted at high velocity through a flared, open distal end 50 of the blower tube 45.

When it is desired to convert the unit 10 to the vacuum mode, in which mode the present invention has particular utility, the cover 42 is removed and replaced by a cylindrical intake vacuum tube/conduit 52. The tube/conduit 52 has a proximal end 54 to be closely received by the conforming inside surface 53 of the rim 40. The tube/conduit 52 has a distal end 56 with an opening 58 therein for drawing in the waste material that is to be picked up, cut up and exhausted through the outlet opening 26. A conventional type hose clamp 59 surrounds the rim 40 and can be tightened to squeeze the rim 40 tightly against the tube/conduit 52 to hold the same firmly in its operative position of FIGS. 2 and 3.

The Model PB-1010, as commercially available, will, in the vacuum mode, draw material through the tube/conduit 52 by suction against the impeller 30 whereupon it will be centrifugally propelled through the outlet opening 26. The vanes 34 on the impeller 30 effect a certain degree of particle size reduction. However, the size reduction is generally not sufficient to use the exhausted particle 60 effectively for mulch and compost preparation. Additionally, the problem of jamming presents itself as larger particles 60 tend to wedge between the impeller 30 and the housing 14.

The present invention contemplates that the cutting structure/cutting attachment 12 will pulverize the incoming material 62 to produce a fine mulch 60 exiting at the outlet opening 26 and at the same time will prevent jamming of the unit 10, even with materials that are relatively damp.

More particularly, the cutting structure/cutting attachment 12 is mounted to the shaft 64 which carries the impeller 30 so that the impeller 30 and cutting structure 12 rotate about the same axis 32 as a unit. The cutting structure/cutting attachment 12 is shown in detail in FIGS. 1-6 and is arranged to nest in an undercut 66 at the center of the impeller 30. The cutting structure/cutting attachment 12 has a mounting base 68 with a bore 70 therethrough to accept the threaded free end 72 of the shaft 64 to which the mounting base 68 is captively held as by a nut 74.

The cutting structure/cutting attachment 12 has four elongate blades 76, 78, 80, 82 which project in cantilever fashion away from the mounting base 68. Each blade 76, 78, 80, 82 has a generally rectangular cross section, however the cross section could be another shape, such as square, circular, elliptical, etc. Connecting arms 84, 86, 88, 90 extend angularly away from the mounting base 68 and support the blades 76, 78, 80, 82 so that the blades 76, 78, 80, 82 are generally parallel to each other and the rotational axis 32 for the impeller 30/cutting structure 12.

The blades 76, 78, 80, 82 project axially with respect to the shaft 64 beyond the outermost edge 100 of the impeller 30 and into the tube/conduit 52.

Figure 4:
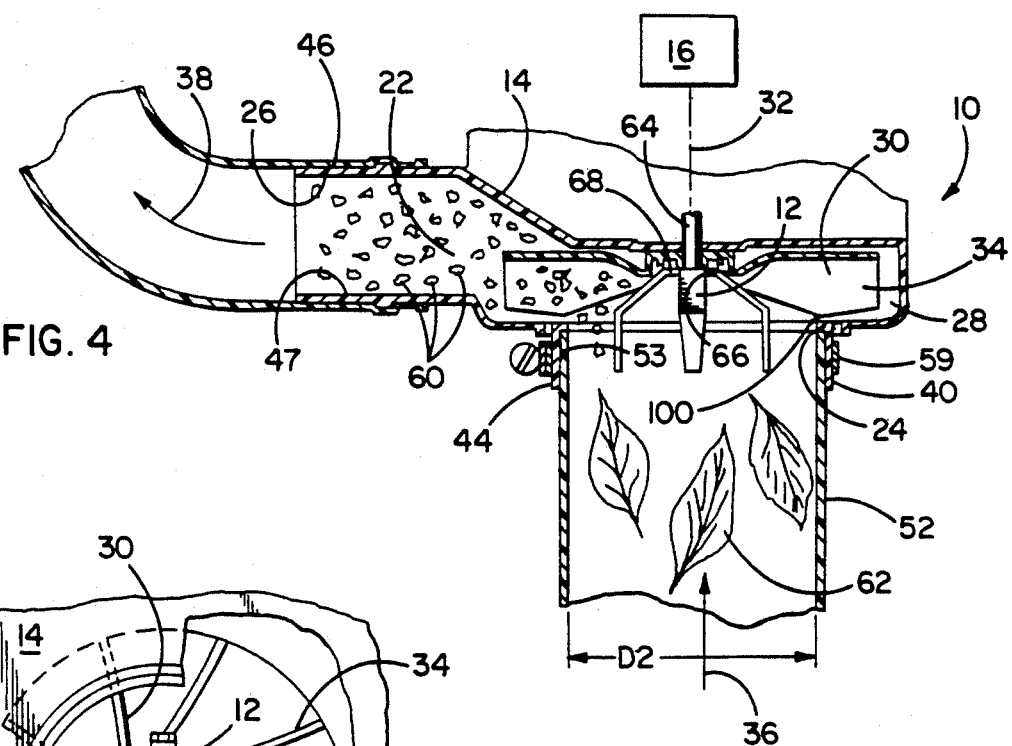
FIG. 4 is an enlarged plan view of the blower/vacuum apparatus partially broken away to show a flow path with yard waste being delivered therethrough.
Figure 5:
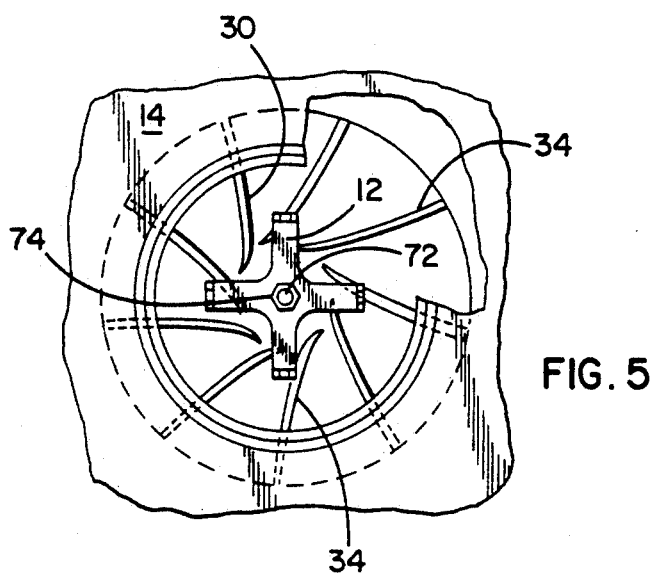
FIG. 5 is an enlarged, side elevation view of the blower/vacuum apparatus showing the inventive cutting structure/cutting attachment.
Figure 2:
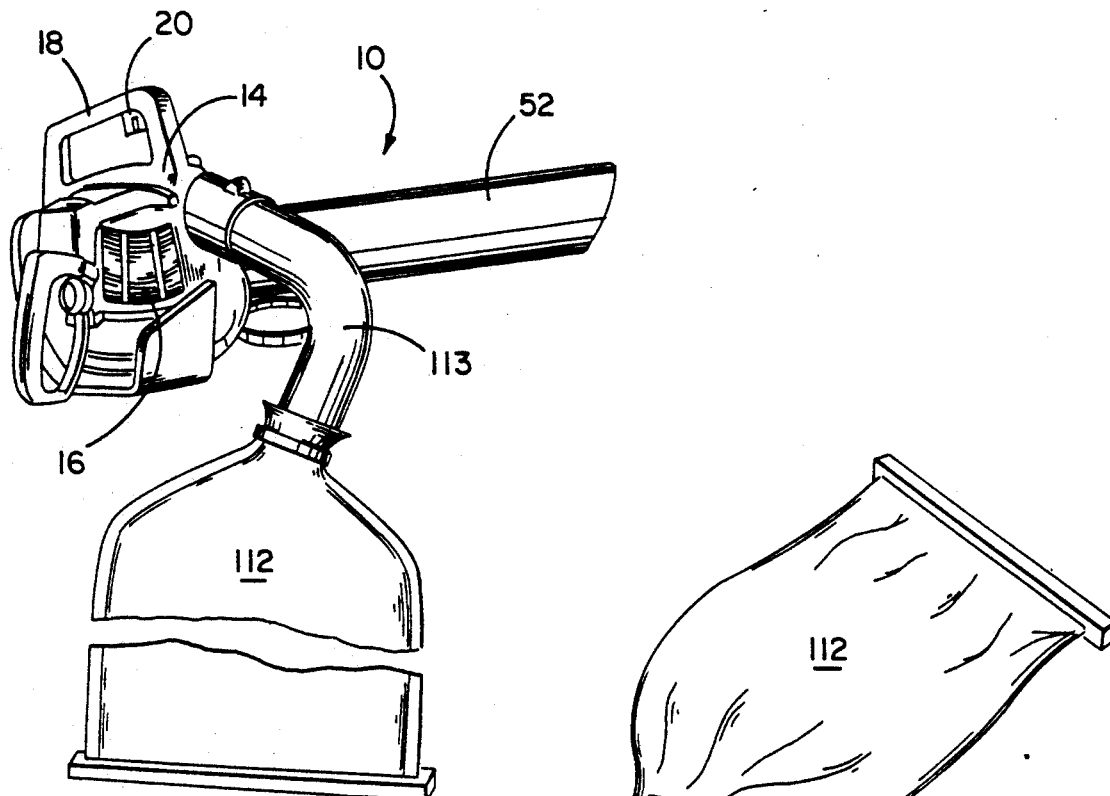
FIG. 2 is a perspective view of the blower/vacuum apparatus of FIG. 1 shown in the vacuum mode.
Figure 3:
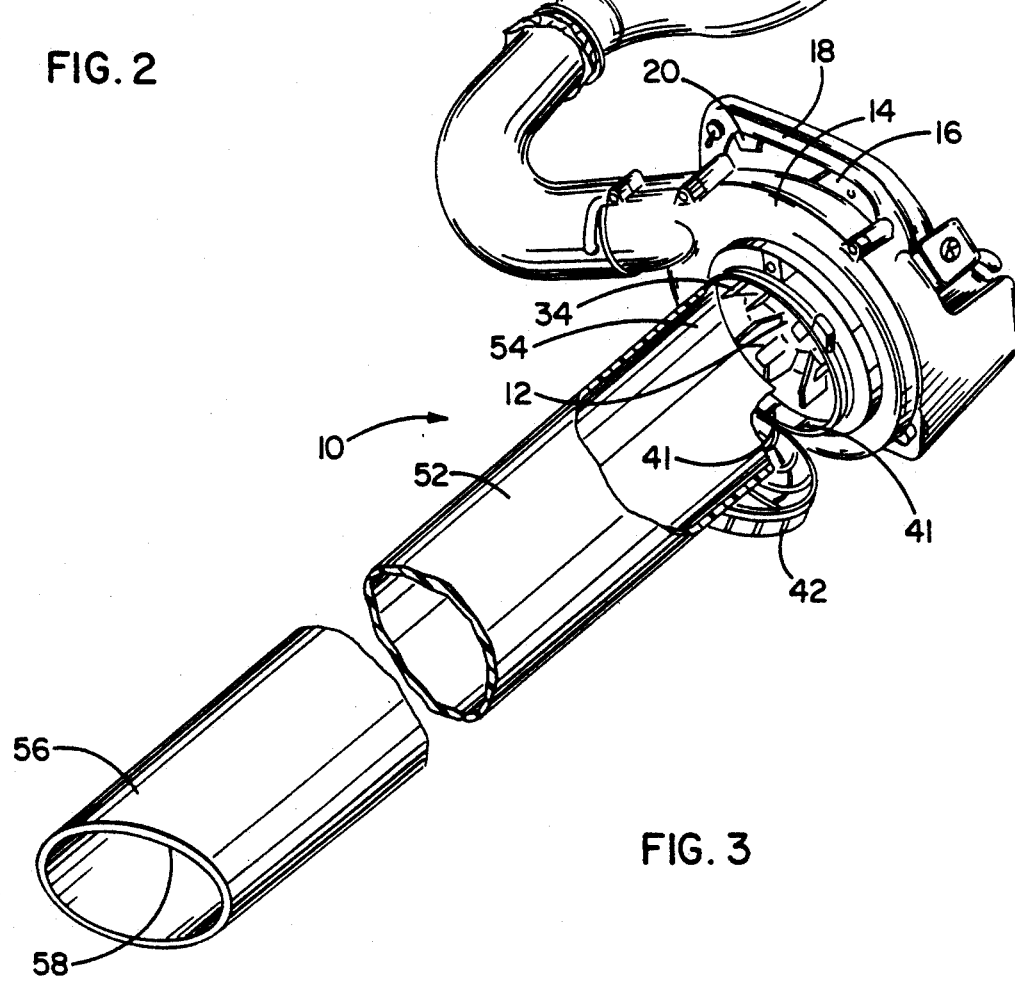
FIG. 3 is a perspective view of the blower/vacuum apparatus in the vacuum mode and having an intake tube/conduit partially broken away to reveal the cutting structure/cutting attachment according to the present invention.
Figure 6:
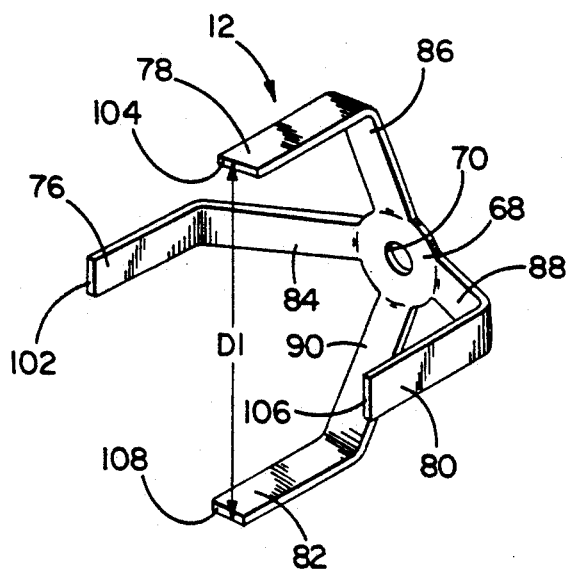
FIG. 6 is an enlarged, isolated perspective view of the inventive cutting structure/cutting attachment.

The operation of the apparatus 10 can be described most clearly with respect to FIGS. 3-5. In FIG. 4, incoming material 62, shown as leaves, but which could be other types of debris, is drawn in through the tube/conduit 52 through suction created by the rotating impeller 30. The simultaneously rotating cutting structure/cutting attachment 12 intercepts the leaves 62. The free ends 102, 104, 106, 108 of the blades 76, 78, 80, 82, respectively, initially engage the leaves 62 and tear into the leaves 62 during rotation of the cutting structure 12. The blades 76, 78, 80, 82 are sufficiently thin, i.e. preferably on the order of 10 gauge material, that they act as knives to shred the leaves 62 further as the leaves progress towards the outlet opening 26. This blade material is at the same time thick enough to limit deformation of the blades 76, 78, 80, S2 during use. The blades 76, 78, 80, 82 have a length/extension from the base 68 that may range on the order of 0.75-2 inches and has been tested effectively with a length of about 1.75 inches.

The spacing D1 between diametrically opposite blade portions 76, 78, 80, 82 is less than the diameter of the housing intake opening 24 which is slightly reduced by the tube/conduit 52. The effective intake opening diameter D2 is thus equal to the inside diameter of the tube/conduit 52. In a preferred form, the diameter D2 is on the order of 1.4 to 1.7 times the diameter D1. With this arrangement, the blades 76, 78, 80, 82 simultaneously swirl the leaves 62 in the annular space 110 between the cutting structure 12 and the tube/conduit 52, at the same time effecting the shredding. Consequently, the leaves 62 are torn and swirled through the inventive structure to be effectively pulverized by the time they impact the impeller 30. The impeller 30 effects further size reduction of the particles which are exhausted at the outlet opening 26. An optional collection bag 112 can be attached to the housing over an elbow 113, which is substituted for the blower tube 45, to accumulate pulverized materials. The elbow 113 is shown to be at 90° but may be any angle to situate the bag 112 as desired.

Figure 7:
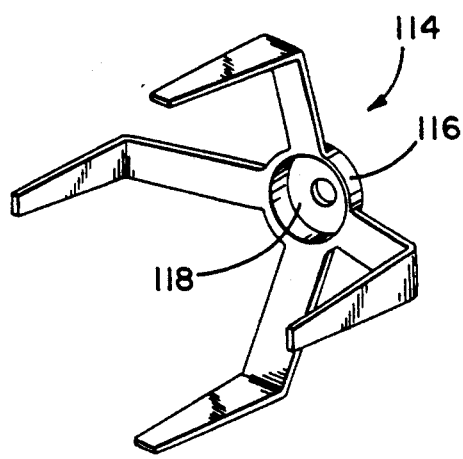
FIG. 7 is a perspective view of a modified form of cutting structure/cutting attachment according to the present invention.

The invention also contemplates various modifications of the cutting structure/cutting attachment 12. In FIG. 7, a cutting attachment is shown at 114 which is similar to that 12 in FIG. 6 with the exception that the base member 116 is cup-shaped and has an undercut receptacle 118 for the locking nut 74.

Figure 8:
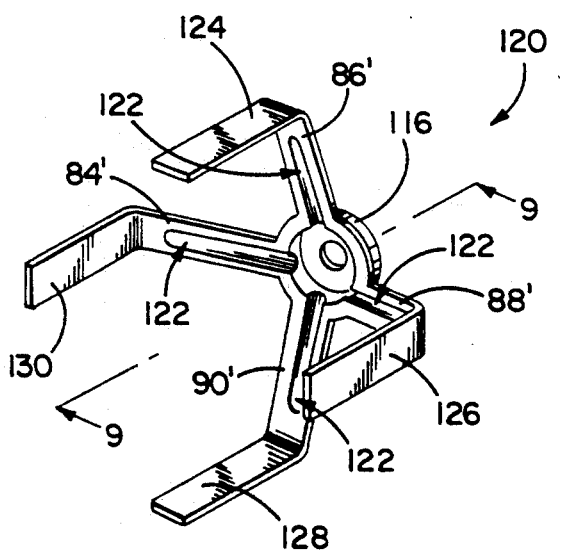
FIG. 8 is a perspective view of a further modified form of cutting structure/cutting attachment according to the present invention.
Figure 9:
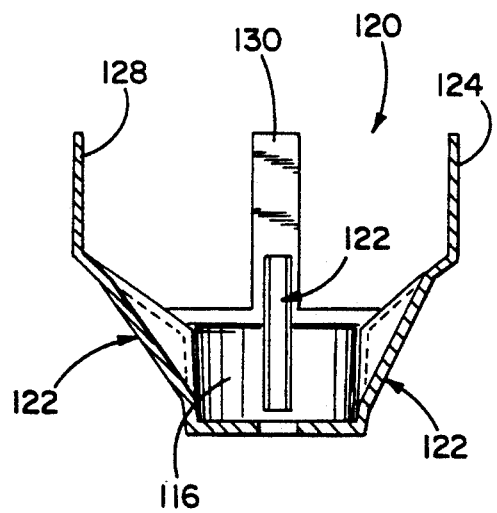
FIG. 9 is a cross-sectional view of the cutting structure/cutting attachment taken along line 9—9 of FIG. 8.
Figure 10:
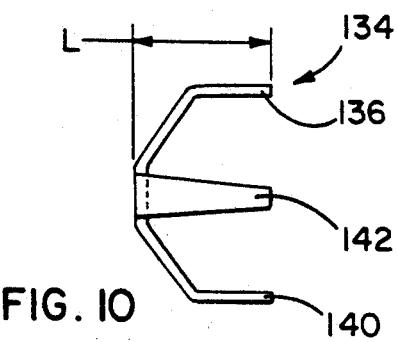
FIG. 10 is an end elevation view of a modified form of cutting structure/cutting attachment according to the present invention.
Figure 11:
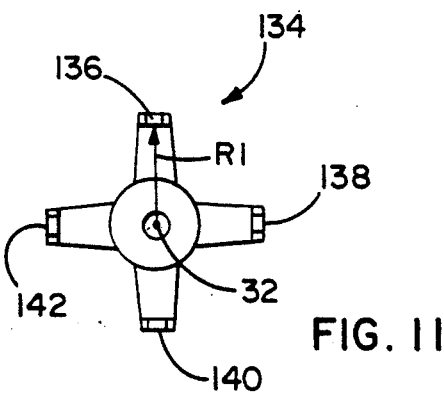
FIG. 11 is a side elevation view of the cutting structure/cutting attachment of FIG. 10.

Another modified form of cutting structure is shown at 120 in FIGS. 8 and 9. Each connecting arm 84', 86', 88', 90' is drawn to define elongate, indentations 122, each having a generally U-shaped cross section. These indentations reinforce the blades 124, 126, 128, 130 against bending during use.

FIGS. 10-17 show certain other variations of cutting structures, which are not intended to be all inclusive of those contemplated by the invention. The cutting structure at 134 in FIGS. 10 and 11 has equidistantly spaced blades 136, 138, 140, 142 of equal length identified by the letter L in FIG. 10, with the blades spaced equidistantly from the rotational axis 32 by a distance R1. In one form of the invention L=1.77 inches and R1=1.25 inches.

Figure 12:
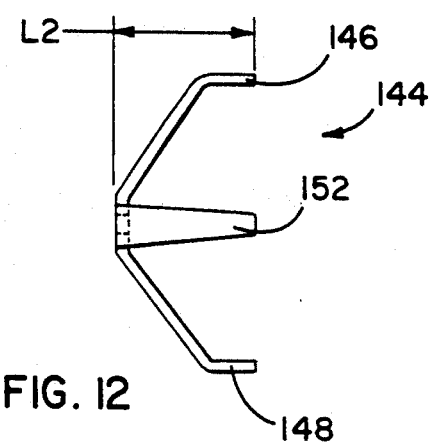
FIG. 12 is an end elevation view of a further modified form of cutting structure/cutting attachment according to the present invention.
Figure 13:
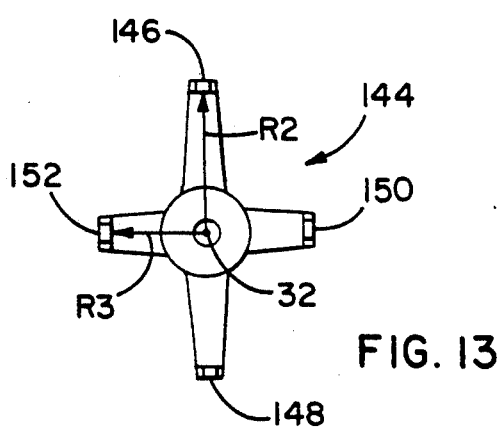
FIG. 13 is a side elevation view of the cutting structure/cutting attachment of FIG. 12.

The cutting structure 144 in FIGS. 12 and 13 has diametrically opposite blade pairs 146, 148 having an equal radial spacing R2 and length L2. The diametrically opposite blade pair 150, 152 has a lesser radial spacing R3 but an equal length L2 to the blades 146, 148. In one form R2=1.87 inches, R3=1.37 inches and L2=1.75 inches.

Figure 14:
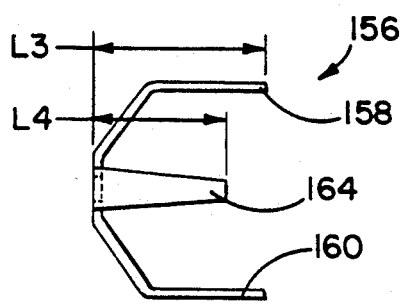
FIG. 14 is an end elevation view of a further modified form of cutting structure/cutting attachment according to the present invention.
Figure 15:
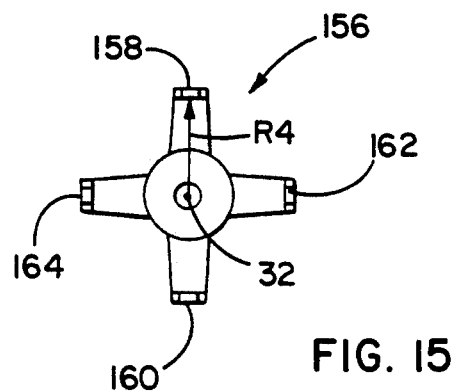
FIG. 15 is a side elevation view of the cutting structure/cutting attachment of FIG. 14.

In FIG. 14, a cutting structure 156 is shown with diametrically opposite blade pairs of equal radial extent and length L3. Diametrically opposite blade pairs 162, 164 have an equal radial extent, R4, to the blade pairs 158, 160 with a length L4 that is shorter than the length L3 for the blades 158, 160. In one form, R4=1.37 inches, L3=2.25 inches and L4=1.75 inches.

Figure 16:
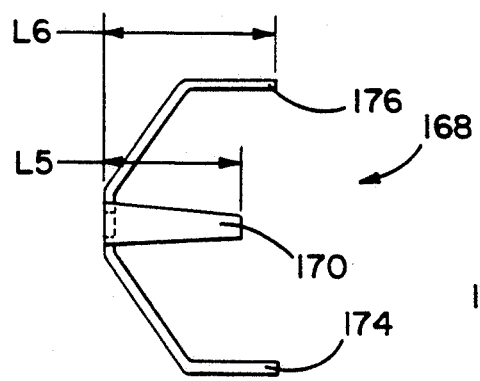
FIG. 16 is an end elevation view of a still further modified form of cutting structure/cutting attachment according to the present invention.
Figure 17:
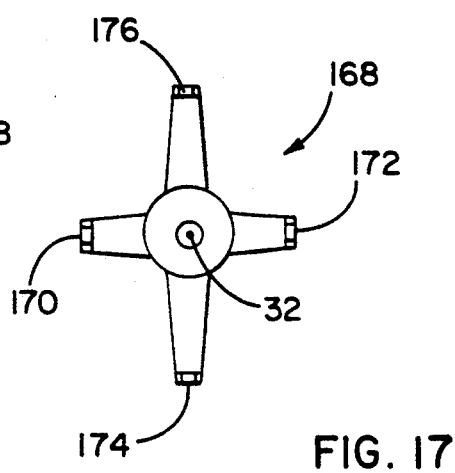
FIG. 17 is a side elevation of the cutting structure/cutting attachment of FIG. 16.

The cutting structure 168 in FIGS. 16 and 17 is similar to that 144 in FIGS. 12 and 13 with the difference being that the diametrically opposite blade pairs 170, 172 have a length L5 that is shorter than the length L6 for the diametrically opposite blade pairs 174, 176. In one form, L5=1.75 inches and L6=2.25 inches.

It should be understood that while the cutting structure 12 has been described interchangeably above as an "attachment", the invention contemplates either separate fitting of the cutting structure 12 or integral formation with one of the shaft and/or impeller 30.

The foregoing disclosure of specific embodiments is intended to be illustrative of the broad concepts comprehended by the invention.

We claim:

1. A portable hand-holdable apparatus for shredding natural yard waste, said apparatus comprising:
  a housing defining an intake opening through which yard waste is to be drawn and an outlet opening through which yard waste drawn through the intake opening can be expelled;
  means on the housing to be engaged by an operator to facilitate holding of the housing by an operator in an elevated operating position relative to a surface having natural yard waste thereon to be picked up and shredded by the shredding apparatus;
  an impeller having a rotational axis and at least one vane for a) intercepting yard waste moving through said intake opening and propelling yard waste intercepted by the one impeller vane centrifugally to be expelled through the outlet opening and developing a suction force to draw natural yard waste at the intake opening upwardly through the intake opening with the housing in its operating position; and
  means for cutting yard waste drawn in the intake opening toward s the impeller vane to reduce the size thereof,
  said cutting means including at least one elongate blade having its length projecting substantially parallel to the rotational axis of the impeller.

2. The apparatus for shredding natural yard waste according to claim 1 including means for mounting the cutting blade for rotation about the impeller axis.

3. The apparatus for shredding natural yard waste according to claim 1 wherein the impeller has a plurality of vanes and the elongate cutting blade extends axially beyond the impeller vanes.

4. The apparatus for shredding natural yard waste according to claim 1 including an intake tube/conduit having an internal passageway in communication with the housing intake opening, said intake tube/conduit having an open end remote from the housing intake opening at which the suction force developed by the impeller can be applied through the internal passageway, said blade extending at least partially into the internal passageway of the intake tube/conduit.

5. The apparatus for shredding natural yard waste according to claim 1 wherein the intake opening defined by the housing has a first diameter, the cutting means is rotatable about an axis and the blade traces a second diameter with the cutting means rotated and the second diameter is less than the first diameter.

6. The apparatus for shredding natural yard waste according to claim 1 wherein the cutting means has a mounting base and a plurality of elongate blades projecting in substantially parallel, cantilever fashion away from said mounting base.

7. The apparatus for shredding natural yard waste according to claim 6 wherein the mounting base defines a rotational axis for the cutting means and a plurality of said blades are spaced equidistantly from the rotational axis of the cutting means.

8. The apparatus for shredding natural yard waste according to claim 7 wherein there is a connecting arm extending radially from the mounting base to at least one said blade.

9. The apparatus for shredding natural yard waste according to claim 8 wherein the connecting arm extends at other than a right angle from the cutting means rotational axis.

10. The apparatus for shredding natural yard waste according to claim 8 including means extending between the mounting base and at least one said blade to reinforce the cutting means.

11. The apparatus for shredding natural yard waste according to claim 6 wherein the mounting base defines a rotational axis for the cutting means and first and second of the elongate blades are spaced at different distances from the rotational axis of the cutting means.

12. The apparatus for shredding natural yard waste according to claim 1 including a rotatable shaft to which the impeller is mounted and means for attaching the cutting means to at least one of the rotor and shaft to follow rotation thereof.

13. The apparatus for shredding natural yard waste according to claim 12 wherein the means for attaching the cutting means comprises means for removably attaching the cutting means so that apparatus can be used selectively with and without the cutting means.

14. The apparatus for shredding natural yard waste according to claim 1 including means for rotating the cutting means about an axis, there are first and second elongate cutting blades on the cutting means each extending generally parallel to the rotational axis of the cutting means and the length of the first and second cutting blades is different.

15. The apparatus for shredding natural yard waste according to claim 1 wherein said cutting means includes four elongate blades each with its length projecting substantially parallel to the rotational axis of the impeller.

16. A hand-holdable apparatus for shredding natural yard waste, said apparatus comprising:
  a housing defining an intake opening through which yard waste is to be drawn and an outlet opening through which yard waste drawn through the intake opening can be expelled;
  means on the housing to be grasped by an operator to facilitate transporting of the apparatus and holding of the housing by an operator in an elevated position relative to a surface having natural yard waste thereon to be picked up and shredded by the shredding apparatus;
  an impeller having a rotational axis and a plurality of vanes for intercepting yard waste at said intake opening;
  power means for rotating the impeller about an axis and developing a suction force at the intake opening to drawn yard waste at the intake opening through the intake opening and against the impeller whereupon the impeller propels yard waste directed thereagainst by centrifugal force to be expelled through outlet opening; and
  means rotatable about the impeller axis for cutting yard waste drawn into the intake opening to reduce the size thereof,
  said impeller having an axially outermost edge,
  said cutting means having at least a portion thereof extending axially beyond the axially outmost impeller edge to intercept and cut yard waste drawn into the intake opening before it encounters the impeller, said cutting means portion being fixed relative to the impeller to at all times have the same orientation relative to the impeller.

17. The apparatus for shredding natural yard waste according to claim 16 wherein the cutting means includes an elongate blade projecting substantially parallel to the impeller axis.

18. The apparatus for shredding natural yard waste according to claim 17 wherein the elongate blade is offset from the rotational axis of the impeller so that as the cutting means rotates the elongate blade traces an annular path.

19. The apparatus for shredding natural yard waste according to claim 18 wherein the intake opening has a first diameter and the first diameter is greater than the diameter of the annular path traced by the elongate blade.

20. The apparatus for shredding natural yard waste according to claim 19 wherein the first diameter is 1.4–1.7 times as large as the diameter of the annular path traced by the elongate blade.

21. A hand-holdable apparatus for shredding natural yard waste, said apparatus comprising:
a housing defining an intake opening through which yard waste is to be drawn and an outlet opening through which yard waste drawn through the intake opening can be expelled;
means on the housing to be engaged by an operator to facilitate holding of the housing by an operator in an elevated operating position relative to a surface having natural yard waste thereon to be picked up and shredded by the shredding apparatus;
an impeller having a rotational axis and a plurality of vanes for intercepting yard waste entering through said intake opening;
power means for rotating the impeller about an axis and developing a suction force at the intake opening to draw yard waste at the intake opening through the intake opening and against the impeller whereupon the impeller propels yard waste directed thereagainst by centrifugal force to be expelled through the outlet opening;
means rotatable about the impeller axis for cutting yard waste drawn into the intake opening to reduce the size thereof,
said cutting means having a first elongate blade that is substantially parallel to the rotational axis of the impeller and traces an annular path,
said intake opening having a diameter that is 1.4–1.7 times as large as the diameter of the annular path traced by the elongate blade.

22. The apparatus for shredding natural yard waste according to claim 21 wherein there is a second elongate blade on the cutting means that is substantially parallel to the rotational axis of the impeller.

23. The apparatus for shredding natural yard waste according to claim 22 wherein the first and second blades are substantially equidistantly spaced from the impeller axis and have substantially the same length.

24. The apparatus for shredding natural yard waste according to claim 23 wherein there are third and fourth elongate blades on the cutting means, said third and fourth blades being substantially equally spaced from the impeller axis and having substantially the same length 25. The apparatus for shredding natural yard waste according to claim 24 wherein the third and fourth blades are spaced the same distance from the impeller axis as are the first and second blades.

26. The apparatus for shredding natural yard waste according to claim 24 wherein the first and second blades have different lengths than the third and fourth blades.

27. The apparatus for shredding natural yard waste according to claim 22 wherein the second elongate blade is spaced a different distance from the impeller axis than the first blade.

28. The apparatus for shredding natural yard waste according to claim 27 wherein the first and second blades have different lengths.

* * * * *